United States Patent [19]

Dempsey

[11] 4,117,705

[45] Oct. 3, 1978

[54] WORK REDUCING AND PRESSURE APPLYING

[75] Inventor: Martin J. Dempsey, Bethel Park, Pa.

[73] Assignee: Asko, Inc., West Homestead, Pa.

[21] Appl. No.: 822,626

[22] Filed: Aug. 8, 1977

[51] Int. Cl.$^2$ .............................................. B21B 31/08
[52] U.S. Cl. ...................................... 72/237; 72/238;
   29/125; 29/252; 403/15
[58] Field of Search .................. 72/237, 238, 199, 247,
   72/250, 245; 29/452, 520, 148.4 D, 129, 123,
   113 R, 125, 130; 403/5, 15, 31, 37-39; 254/93
   R, 29 A

[56] References Cited

U.S. PATENT DOCUMENTS

| | | | |
|---|---|---|---|
| 2,988,794 | 6/1961 | Gutt | 254/29 A X |
| 3,097,003 | 7/1963 | Deve et al. | 403/31 X |
| 3,267,568 | 8/1966 | Johnson et al. | 29/252 |
| 3,285,568 | 11/1966 | Biach | 254/29 A |
| 3,772,759 | 11/1973 | Bunyan | 29/252 |
| 3,842,640 | 10/1974 | Schmitt et al. | 72/238 |
| 3,865,497 | 2/1975 | Bratt et al. | 403/15 |
| 3,945,235 | 3/1976 | Oxlade et al. | 72/238 |
| 4,008,598 | 2/1977 | Purcupile et al. | 72/237 |

Primary Examiner—Milton S. Mehr
Attorney, Agent, or Firm—Hymen Diamond

[57] ABSTRACT

Reduction of bars or rods with reducing rolls of large diameter on arbors in which lateral pressure is applied to the reducing rolls to suppress rotation of the rolls relative to the arbor. The pressure is applied by an annular shoe on the arbor. The shoe and an annular fluid activator, on the arbor form, between their facing surfaces, a sealed annular chamber and also an annular gap. The gap is accessible through the peripheries of the activator and shoe. Axial movement of the activator outwardly of the rolls is restricted by a nut on the arbor. Grease is injected into the chamber under high pressure. The shoe and activator operate as a split cylinder impressing tensile stress on the arbor between the side of the shoe remote from the activator and the nut and causing the arbor in this region to elongate and also to impress compressive force on the roll and its axial components. This elongation enlarges the width of the gap. With the width enlarged, a split annular spacer whose width is greater than the unenlarged width of the gap but smaller than the enlarged width of the gap is interposed in the gap. The grease is then drained causing the arbor to retract and compress the spacer. The resulting lateral pressure is transmitted to the rolls to suppress their relative rotation.

18 Claims, 16 Drawing Figures

FIG. 1

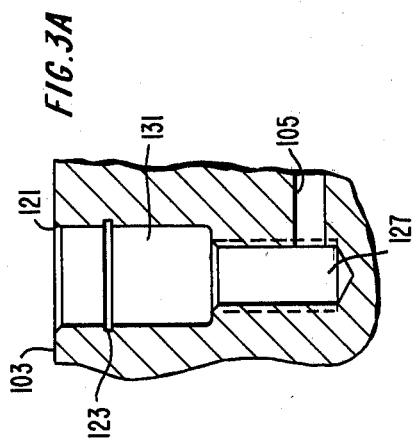
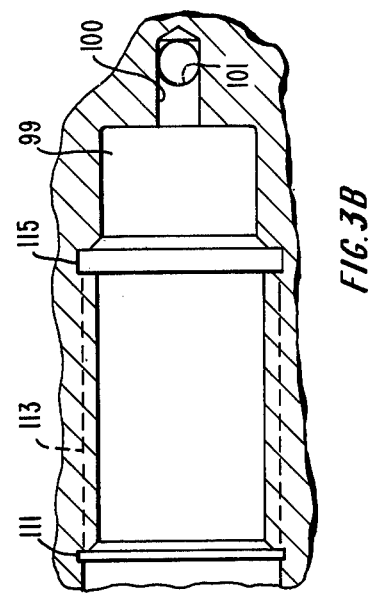
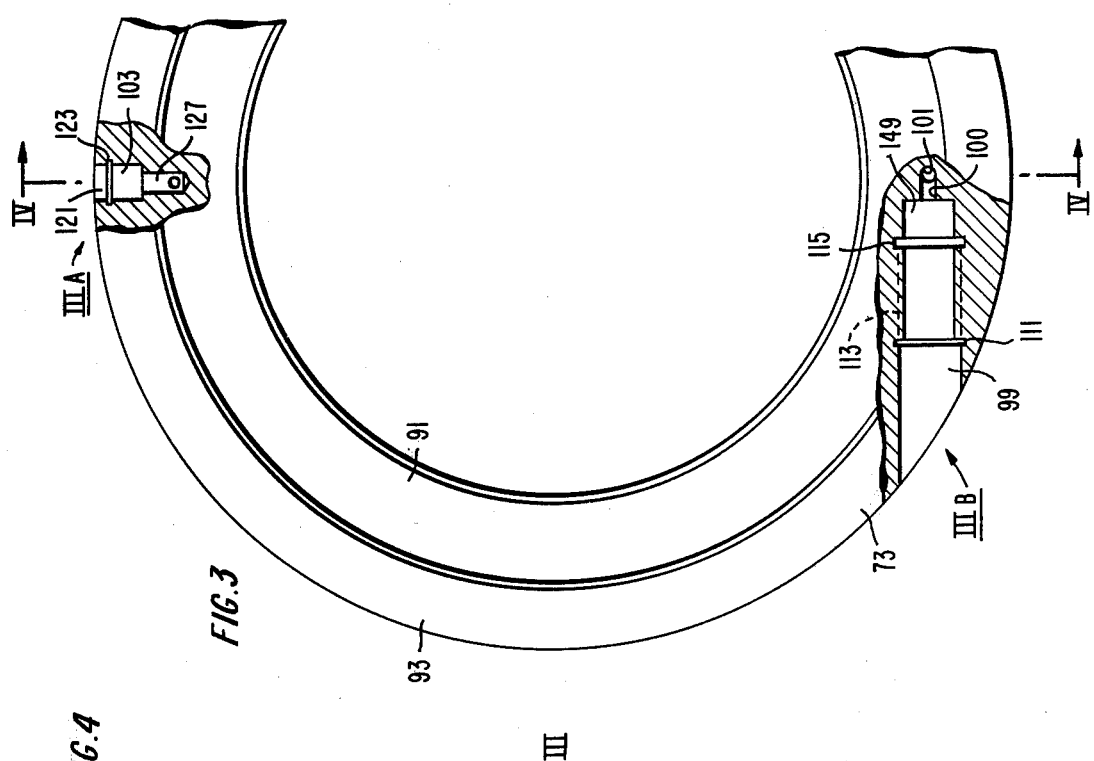
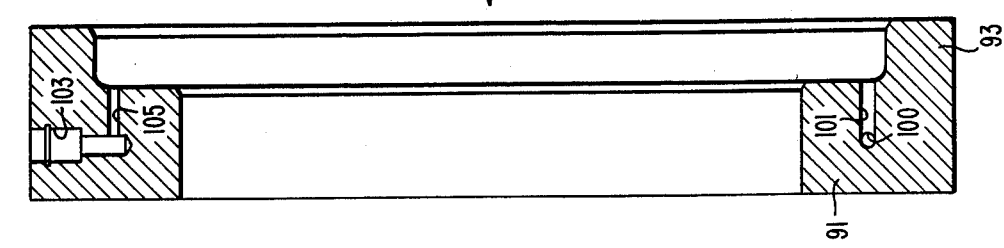

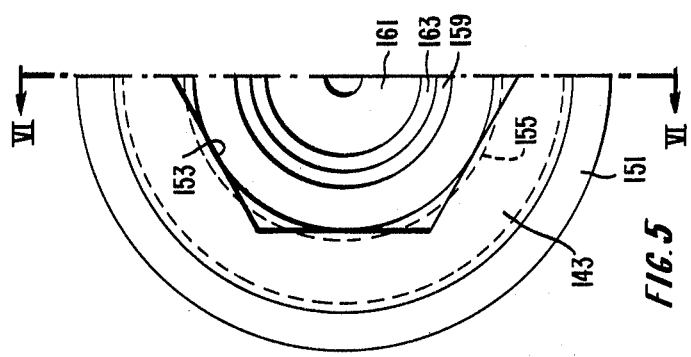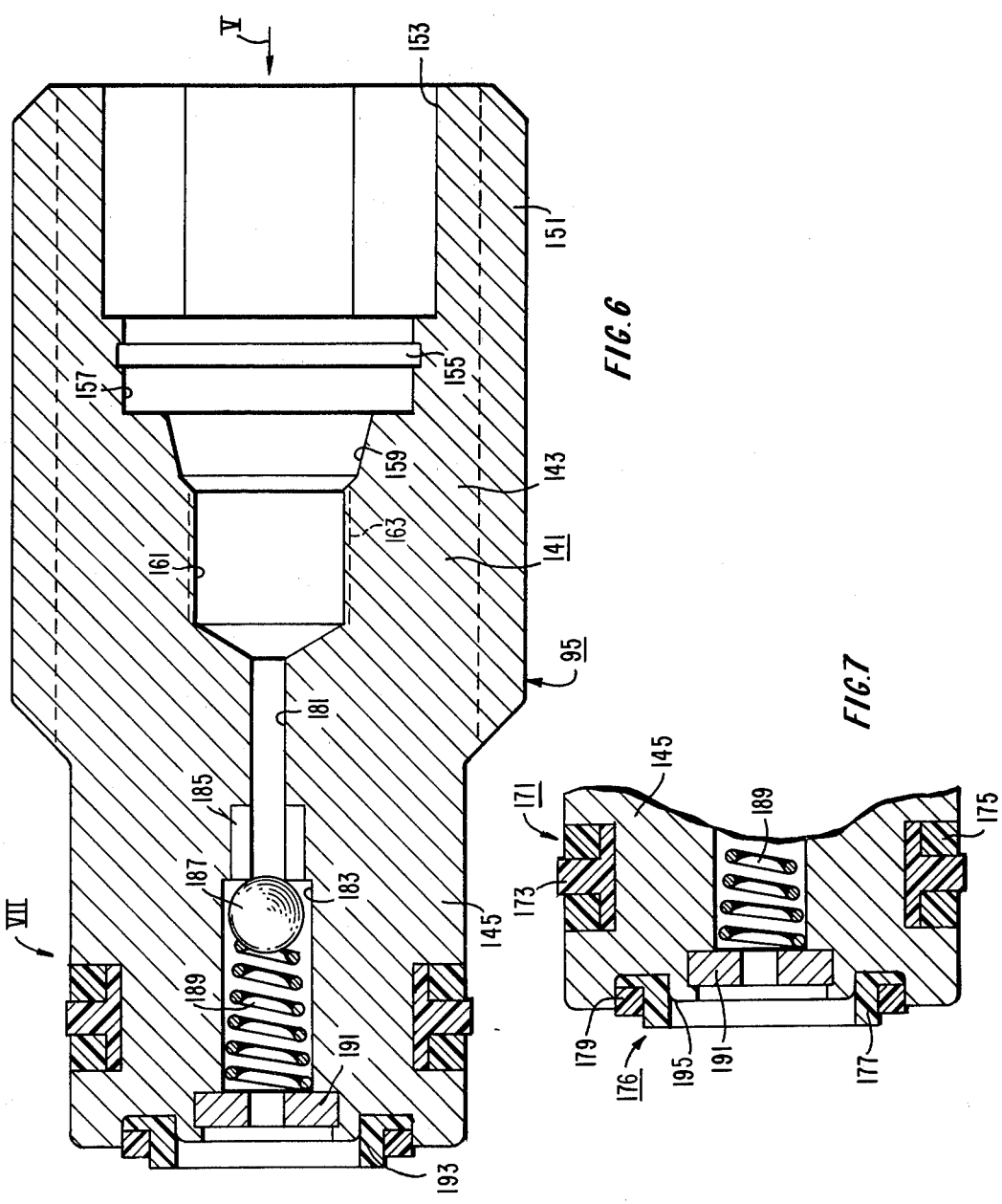

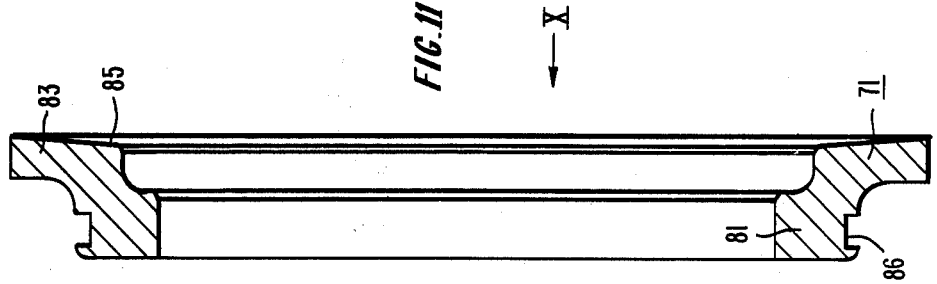
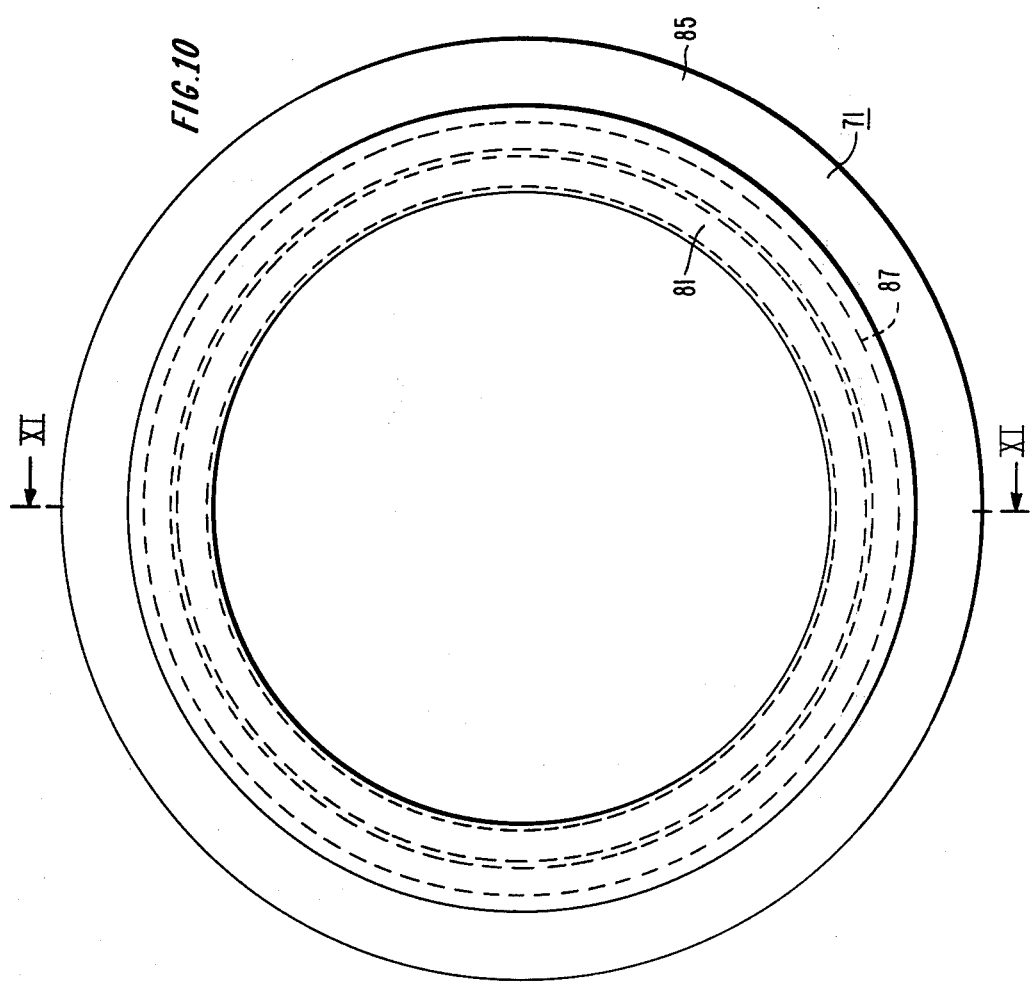

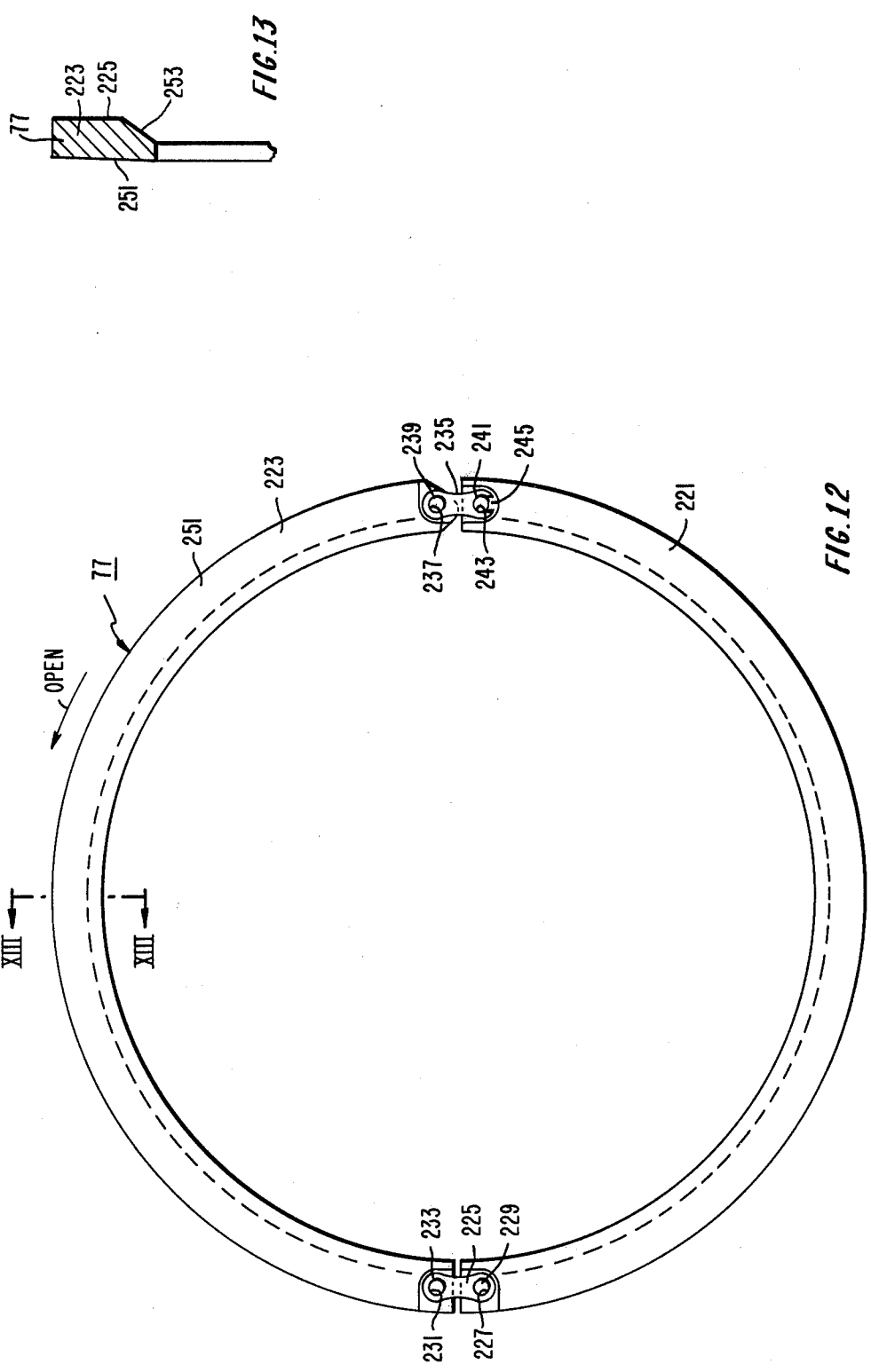

WORK REDUCING AND PRESSURE APPLYING

BACKGROUND OF THE INVENTION

This invention relates to work reducing, typically the reduction by rolls, of billets to bars, bars to bars of smaller thickness, or rods to wire. The rolls may be composed of metal such as iron or steel, but of particular interest is work reducing in which the rolls are composed of metalloids of the tungsten carbide type. The expression "of the tungsten—carbide type" as used in this application means metalloids of all types including carbides of molybdenum, tantalum, niobium and others and also borides, silicides, nitrides and the like. In the interest of dealing in a concrete example to aid those skilled in the art in understanding this invention, this invention will be described as applied to the reduction of bars to bars of smaller cross section by oppositely acting rolls. This invention is applicable to reducing of work of other types and such other work reducing is within the scoe of this invention.

In reducing work the radial pressure applied between each oppositely acting roll and the work is high and the tangential friction force on each roll is correspondingly high. The resulting reactive torque between the roll and the arbor on which the roll is mounted is correspondingly high and under this torque the roll tends to rotate relative to the arbor. This invention has particular relationship to the suppression of this relative rotation and it is an object of this invention to suppress the rotation of the roll relative to the arbor.

U.S. Pat. No. 4,008,598, Purcupile et al, discloses work-reducing apparatus in which lateral pressure is applied to suppress relative rotation of rolls by deformation of a deformable membrane under continuously applied hydraulic pressure. This apparatus has performed highly satisfactorily serving to reduce work during many hours of operation. However, the membrane is subject to failure by reason of fatigue resulting from the repeated impacts of the rolls against the work and it is desirable to preclude such failure.

It has also been proposed, in accordance with the teachings of the prior art, that the lateral pressure to suppress relative rotation of the rolls be applied by a heavy Belleville spring which is precompressed by a press. This expendient has the disadvantage that it demands the use and availability of a massive press or machine tool of similar type. In addition, the spring tends to relax while in use.

It is accordingly an object of this invention to overcome the deficiencies of the prior art and to provide for suppression of the relative rotation of the reducing rolls without continuous supply of hydraulic fluid and without a deformable membrane or of any other component which, in use, may fail from fatigue or relaxation, and without the requirement of the availability of a massive press or any other costly machine. It is also an object of this invention to provide a method for achieving the above object and work-reducing apparatus for practicing this method. It is a further object of this invention to provide apparatus and a method for applying high pressure or high thrust to a body, which apparatus shall not require a deformable membrane or massive machine tool for applying the high pressure or high thrust to a body.

SUMMARY OF THE INVENTION

In accordance with this invention, pressure is built up by a fluid and transferred to a pressure memory component. After the pressure is built up, the memory component is introduced; then the fluid is partly or wholly drained transferring the pressure to the memory component. The memory component transmits the pressure to suppress the relative rotation of the rolls or for other purposes. Preferably, the fluid is a hydraulic fluid, typically a grease of the type disclosed in Purcupile, et al patent. The use of gases or even low-melting metals or alloys for this purpose is within the scope of this invention.

This invention is practiced with apparatus which may be described as a split-piston pressure-applying means. This means includes a first member, which may be described as a shoe connected in pressure-transmitting relationship to the roll and a cooperative member. The shoe and cooperative member are mounted axially movable on the mandrel on which the roll is mounted with the shoe nearest the roll and the cooperative member on the side of the shoe remote from the roll. The cooperative member abuts an abutment such as a nut screwed or welded or keyed onto the mandrel and the shoe abuts the roll or components or spacers engaging the roll. A sealed cavity or chamber and a gap are formed between the shoe and the cooperative member. The gap is accessible from the outside of the two members. The shoe and cooperative member are the oppositely movable parts or piston components of the split piston. A fluid is injected into the chamber building up high pressure in the chamber separating the shoe and the cooperative member and enlarging the width of the gap. The mandrel is elongated. The elongation is preferably within the elastic limit of the mandrel so that the mandrel exerts a restoring force, like a spring. This force is counteracted by the fluid so long as the fluid is retained in the chamber. After the width of the gap is enlarged, a spacer is inserted in the gap. The spacer has a width greater than the unenlarged width of the gap and smaller typically by a small magnitude than the enlarged width of the gap. The fluid is then drained from the chamber permitting the restoring force of the mandrel to act. The separation between the cooperative member and shoe is then reduced and the pressure which was built up by the drained fluid is impressed on the spacer and through it on the shoe and rolls.

The fluid can be injected through the cooperative member, through the shoe or through the mandrel or, in an exceptional situation, through any combination of these components. The fluid can be drained through the same channel through which it is injected or through a different channel or combination of channels. It is advantgeous that the width of the spacer be smaller than the width of the enlarged gap by only a small magnitude because under this condition, a high proportion of the pressure built up by the fluid is available for application as here, to suppress rotation of the roll.

It is within the scope of this invention to drain all of the fluid out of the chamber or to drain only a portion of the fluid out of the chamber. The complete draining of the fluid has the advantage that the seals are subject to stress only during the pressurizing of the pressure-receiving means. In addition, by draining the fluid completely, the pressure is concentrated in the desired direction. In the case of the rolls, the desired direction is the axial direction. The draining of the fluid relieves the stress in the radial direction. Where the thrust is to be very high the chamber has walls of substantial surface area and the stress-resistant cross section of the members defining the chamber may be correspondingly reduced. Since the fluid is drained after being injected, the stress in the regions of small cross section is relaxed and the members are not subjected to failure by reason of creep after the processed apparatus is in service. It is also possible, where the thrust is to be very high, to provide members of very large cross section, for example by shrinking rings or liners on the two members, and to reduce the cross section after the fluid is drained. Such reduction is feasible because the thrust is concentrated in the axial direction and is small in other directions.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 3 is a view in end elevation in the direction of the arrow III of FIG. 4, of the fluid activator of the apparatus shown in FIG. 1 with the regions about the ports for seating the check valve for injecting the fluid and the bleed screw sectioned;

FIG. 3A is an enlarged fragmental view in section of the portion of FIG. 3 in the area labelled IIIA;

FIG. 3B is an enlarged fragmental view in section of the portion of FIG. 3 in Area labelled III B;

FIG. 4 is a view in section taken along line IV—IV of FIG. 3;

FIG. 5 is a view in end elevation as seen from the direction of the arrow V of FIG. 6, of half of the check valve for injecting the fluid of the apparatus shown in FIG. 1;

FIG. 6 is a view in section taken along line VI—VI of FIG. 5;

FIG. 7 is a fragmental view in section of the part of the check valve in area VII of FIG. 6 showing the seal assembly of the check valve;

FIG. 10 is a view in end elevation of the shoe of the apparatus shown in FIG. 1 as seen from the direction of the arrow X of FIG. 11;

FIG. 11 is a view in section taken along line XI—XI of FIG. 10;

FIG. 12 is a view in end elevation of the spacer of the apparatus shown in FIG. 1; and FIG. 13 is a view in section taken along line XIII—XIII of FIG. 12.

DETAILED DESCRIPTION OF EMBODIMENTS

Figure 1:
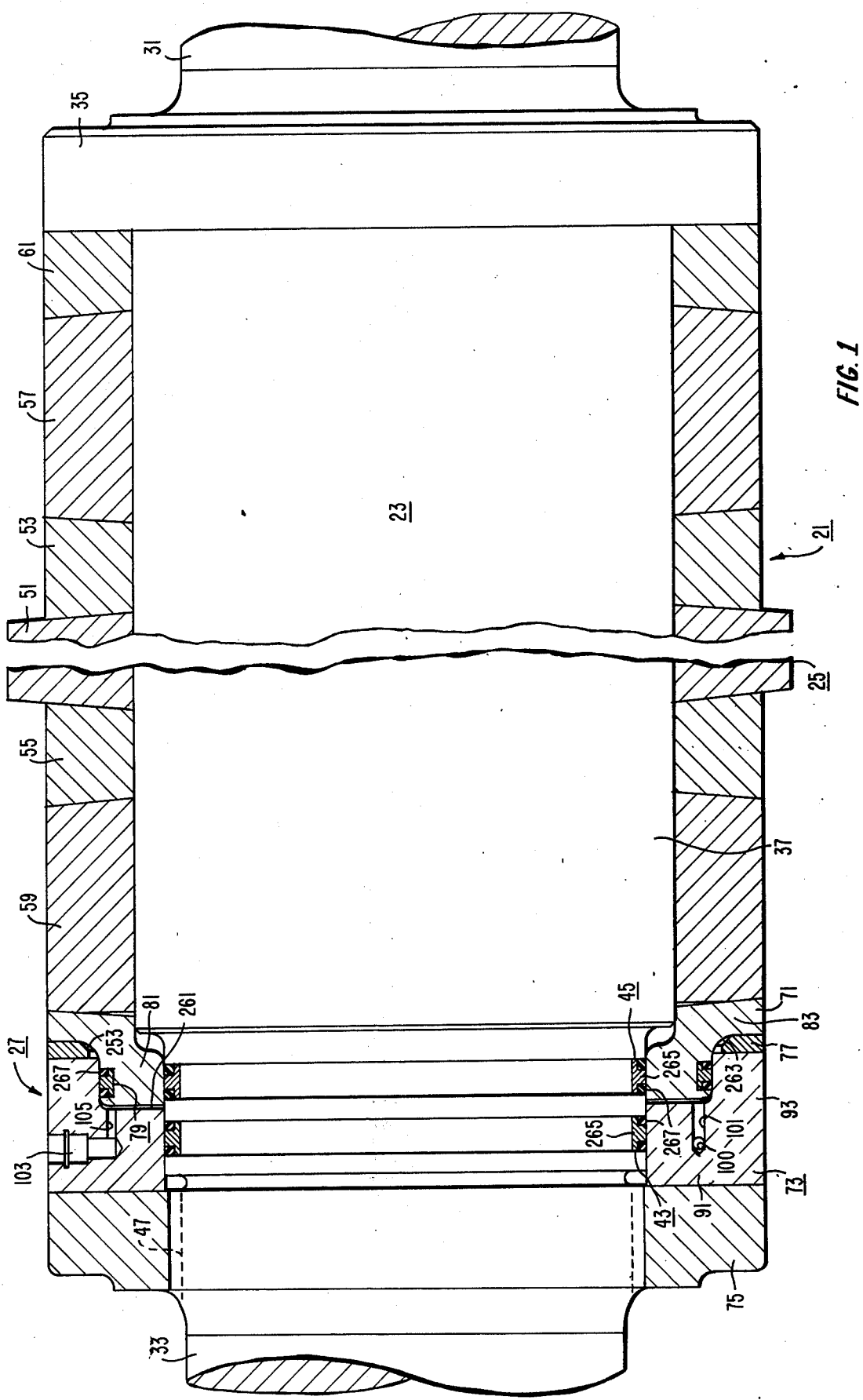
FIG. 1 is a view in longitudinal section, with the mandrel unsectioned, of apparatus in accordance with this invention and for practicing this invention.

The apparatus shown in the drawings is workreducing apparatus 21 including a mandrel 23, a roll assembly 25 mounted rotatably on the mandrel 23, and a split-cylinder pressure applying assembly 27.

Figure 2:
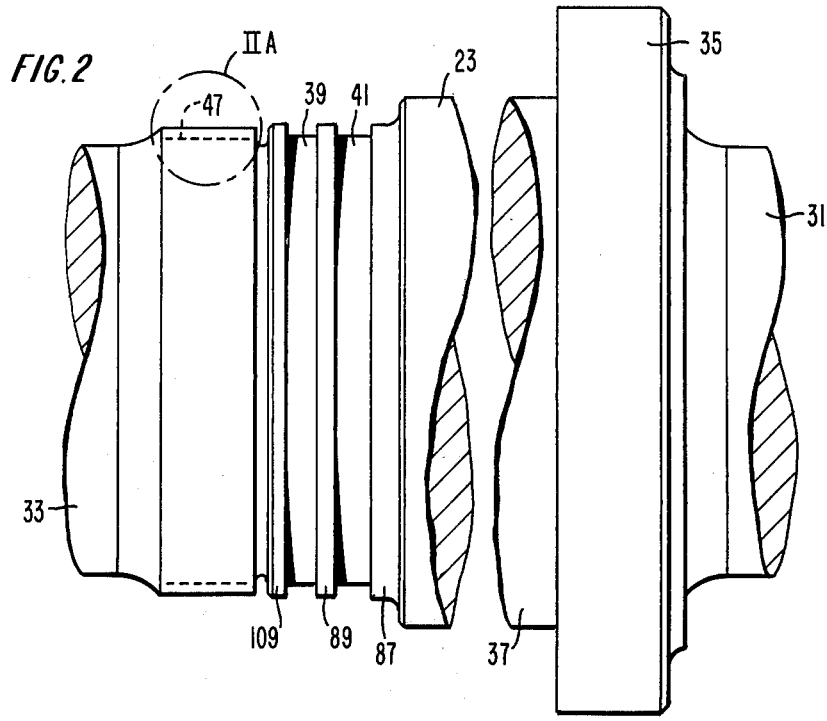
FIG. 2 is a fragmental view in side elevation showing the portion of the mandrel of the apparatus shown in FIG. 1 on which the two members, in this specific case an activator and a shoe, are mounted.

The mandrel 23 is of circularly cylindrical cross section having journals 31 and 33 at the ends so that it may be rotatably supported on bearings (not shown) and driven. The mandrel has a shoulder 35 at the end of journal 31 against which the roll assembly 25 abuts. Near the end of journal 33 the diameter of the mandrel is reduced. In the region adjacent the central portion 37, the reduced portion of the mandrel is provided with grooves 39 and 41 (FIG. 2) in which sealing rings 43 and 45 are mounted. At the end adjacent to the journal 33 the mandrel has a thread 47.

Typical significant dimensions of the mandrel 23 in inches are as follows (FIG. 2):

Diameter of shoulder 35 — 12.25
Length of shoulder 35 — 2.000
Diameter of central portion 37 — $9.2622 \pm ^{0.0002}_{0.0000}$
Length of central portion — 18.000
Transition to reduced diameter region — taper 0.06 × 45° — filet 0.25
Reduced diameter — $8.249 \pm ^{0.0000}_{0.001}$
Length of shoulder to groove 41 — 0.530
Length of shoulder between grooves 39 and 41 — 0.360
Width of grooves 39 and 41 — each — $0.579 \pm ^{0.010}_{0.000}$
Diameter of grooves 39, 41 — $7.774 \pm ^{0.000}_{0.000}$
Length of shoulder from groove 39 — 0.327
Transition to thread 47 — taper 06 × 45° radius 0.25
Length of thread — 1.850
Type of thread — ACME — 2½ Thd per inch
Nominal diameter thread — 8.1400
Major diameter thread — 8.1300
Pitch diameter thread — 7.930
Depth of thread — 0.200
Pitch of thread — 0.400
Taper of thread — 29°
Diameter of journals 31, 33 — $7.500 \pm ^{0.000}_{0.002}$
Overall length of mandrel 23 — $24.500 \pm 0.005$ Typically the mandrel 23 is composed of AISI-4340 Cri-Ni-Mo alloy steel quenched and tempered to 350 Brinnel hardness. Such steel has a 0.2% tensile yield stress of about 140,000 pounds per square inch.

The roll assembly 25 includes a tungsten carbide roll 51 which is shrunk onto the central portion 37 of the mandrel 23 near its center. The roll 51 (FIG. 1) is tapered increasing in thickness towards the mandrel. The taper is 4° 46 feet as disclosed in Purcupile, et al patent. At the outer surface the roll 51 has a thickness typically of 4.3650 inches. The roll 51 is abutted by spacers 53 and 55 of steel. These spacers 53 are tapered oppositely to the roll 51 as disclosed in Purcupile et al patent and at its outer surface, each has a typical thickness of 1.750 inches. Spacers 53 and 55 are each abutted by a steel spacer 57 and 59 respectively tapered oppositely to spacers 53 and 55 and at its outer surface, each has a typical thickness of 4.083 inches. Spacer 57 is abutted by steel spacer 61 which also abuts shoulder 35. Spacer 61 is tapered oppositely to spacer 57 only along its surface abutting spacer 57. The thickness of the outside surface of spacer 61 is determined by the thicknesses of the other spacers and other components and the overall length of the central portion 37 of the mandrel 23. The spacers 53 through 61 are a tight sliding fit on the mandrel similarly to fit of the spacers of Purcupile, et al patent.

The split-cylinder pressure applying assembly 27 includes, in addition to the sealing rings 43 and 45, an annular shoe 71, an annular fluid activator 73, a nut 75, a split spacer 77 and an additional sealing ring 79 (FIG. 1).

The shoe 71 has an annular body 81 and a flange 83. The inner surface 85 of the shoe 71 engages the outer surface of the outer spacer 59 of the roll assembly and is tapered oppositely to this surface. The taper is as disclosed in Purcupile, et al patent (for shoe 43, FIG. 8 Purcupile). The body 81 of the shoe 71 has a slot 86 (FIG. 11) in which the sealing-ring assembly 79 is mounted. Typically, significant dimensions of a shoe in inches are as follows:

Overall outside diameter of flange 83 — 12.25
Overall outside diameter of body 81 — 10.498 ± $^{0.001}_{0.000}$
Maximum inner diameter of flange 83 — 9.266 ± $^{0.001}_{0.000}$
Inner diameter of body 81 — 8.251 ± $^{0.001}_{0.000}$
Transition from inner diameter of flange 83 to inner diameter of body 81 — taper 0.03 × 45 filet 0.32R — taper 0.06 × 30°
Outside thickness of flange 83 — 0.53
Maximum overall thickness shoe — 1.60
Width of slot 79 — 0.475 ± $^{0.010}_{0.000}$
Diameter of base of slot 86 — 10.024 ± $^{0.000}_{0.002}$
Minimum thickness of body 81 — 0.86
Arc between outer edge of slot 87 and outer edge of body 81 — 0.19R depth 0.18

The shoe 71 is a tight sliding fit on the reduced diameter portion of the arbor 23. It is to be noted that typically the outside diameter of the shoulders 87 and 89 (FIG. 2) of this portion of the arbor on which the shoe 71 is seated is 8.249 ± $^{0.000}_{0.001}$ while typically the inner diameter of the body 81 which is seated on these shoulders is 8.251 ± $^{0.001}_{0.000}$.

Figure 9:
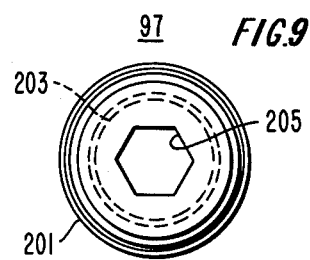
FIG. 9 is a view in end elevation of the bleed screw as seen from the direction of arrow IX of FIG. 8.
Figure 8:
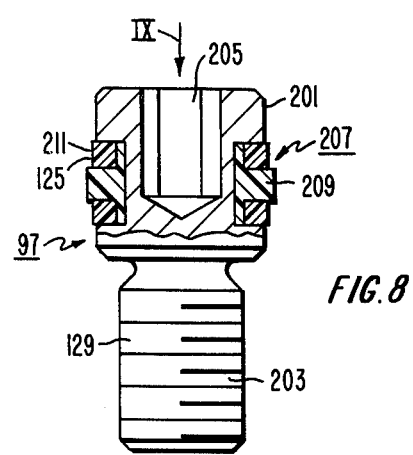
FIG. 8 is a view in side elevation of the bleed screw of the fluid activator shown in FIG. 5.

The fluid activator includes an annulus (FIGS. 3, 3A, 3B, 4) of L-cross section having a stem 91 and a foot 93. The fluid activator also has a check valve 95 (FIGS. 5, 6, 7) and a bleed screw 97 (FIGS. 8 and 9). The check valve 95 is seated in a port 99 in annulus 91 - 93 which penetrates through the periphery of the annulus 91 - 93 and extends tangentially into the stem 91. The port 99 terminates in a channel 100 which communicates with an axial opening 101 in the stem 91 near the foot 93. The axial opening 101 opens in the internal surface of the stem 91. The internal surface is the surface towards the roll assembly 25 and the external surface is the surface away from the roll assembly 25. The bleed screw 97 screws into and seals a bleeder opening or port 103 in the annulus 91 - 93 which penetrates radially through the periphery of the annulus 91 - 93. The bleeder port 103 communicates with an axial opening 105 which opens in the internal surface of the stem 91.

The annulus 91 - 93 has typical significant dimensions in inches as follows:

Overall diameter —12.25
Inner diameter of foot 93 — 10.501 ± $^{0.001}_{-0.000}$
Taper outer surface to inner surface of foot — 0.002 per 0.750 in length
Taper at tip of foot 93 — 0.08 depth × 30°
Filet at junction of stem 91 and foot 93 — 0.16R
Overall thickness — 2.250
Thickness of stem 91 — 1.37
Inner diameter of stem 91 — 8.251 ± $^{0.001}_{0.000}$
Taper of inner edge of stem 91 — 0.06 depth × 30°
Distance from axis of annulus 91–93 to centers of port 99 and openings 100 and 101, center 101 being on axis of hole 100 — 5.00.
Distance from axis of annulus to center of opening 105 — 5.00
Opening 101 — 0.187 drill × 0.75 deep
Distance from outer surface annulus 91 - 93 to center line bleeder port 103 — 0.68
Hole 105 — 0.125 drill × 0.70 deep The activator 73, like the shoe 71, is tightly slideable on the mandrel 23. Compare the typical OD of 8.249 ± 0.001 of shoulders 89 and 109 of the mandrel 23 and the ID of the stem 91 of 8.251 ± $^{0.001}_{0.000}$.

Because the fluid is injected through it, the member 91 - 93 is here called a fluid activator. As pointed out, the fluid can also be injected through the mandrel 23, i.e., through an axial and a radial hole in the mandrel or through the shoe 71. Generally the activator 91 - 93 and the shoe 71 are properly described as cooperative members.

The port 99 (FIGS. 3, 3B) is formed to receive the check valve 95 (FIG. 6). The port includes an entrance shoulder 111, a thread 113 into which the check valve 95 is screwed and a slot 115 into which the thread 113 runs out.

Typical dimensions of the port 99 (FIG. 3B) in inches are as follows:

Overall diameter — 0.931 ± 0.003
Distance from entrance to shoulder 111 — 0.046 ± $^{0.003}_{0.000}$
Outside diameter of thread 111 — 0.886 ± $^{0.002}_{0.000}$
Thread — 0.875 — 9 UNC
Diameter slot 115 — 0.918
Width slot 115 — 0.12
Distance inner end slot to opening 100 — 0.48
Distance shoulder 111 to center opening 101 — 2.125
Distance shoulder 111 to opening 100 — 1.840 ± $^{0.001}_{0.000}$
Taper from shoulder 111 — 0.03 × 45°
Opening 100 — Drill 0.187 × 0.38 deep The bleeder port (FIG. 3A) includes an entrance shoulder 121 and a slot 123 for a snap ring (not shown) to hold on the bleed screw 97 and terminates in a threaded hole 127 of reduced diameter to receive the screw thread 129 on the end of the screw 97.

Typical critical dimensions of the port 103 are as follows in inches:

Overall length — 1.25
Length of upper portion of top of shoulder 21 — 0.68
Tapered entrance shoulder 121 — 0.03 × 45°
Diameter upper portion 131 below shoulder 121 — 0.437 ± $^{0.001}_{0.000}$
Diameter slot 123 — 461 ± 0.002
Width slot 123 — 0.025 ± 0.002
Shoulder transition to thread 127 — 0.03 × 45°
Length upper portion 131 below slot 123 — 0.437
Thread 127 — 0.312 — 24 UNF top The check valve 95 (FIGS. 5, 6, 7) includes a block 141 of circular transverse cross section. This block 141 is formed to be screwed into and nest within the port 99. The portion 143 of the block 141 outwardly, with respect to the port 99, tapers along a 45° shoulder to the inner portion 145 which seats in the inner space 149 of the port 99. The outer part 143 bears an external thread 151 so that it can be screwed into the thread 113 of the port 99. The outer part 143 has a hexagonal opening 153 to accommodate a wrench so that it may be screwed into the thread 113. Inwardly of the hexagonal opening the opening in the block 141 is formed to accommodate the head of a Parker hollow-hex-head plug (not shown).

For this purpose the upper portion 143 of the block 141 has a circularly cylindrical relief slot 155 which communicates with a circularly cylindrical pocket 157 for the head of the plug. A tapered opening 159 extends from the pocket 157 to an opening 161 having a thread 163 into which the Parker plug screws. The Parker plug has an O-ring (not shown) below its head which seals against the tapered opening 159. In addition, the Parker plug is held by a snap ring (not shown) which snaps into the relief slot 155. The Parker plug is inserted and seals the opening against failure of the valve after the pressure fluid is injected through the check valve. The hexagonal opening 153, the slot 155, the pocket 157, the opening 159 and the opening 101 are symmetric about the axis of the block 141.

The inner portion 145 of the block 141 includes a peripheral slot in which a sealing ring assembly 171 (FIG. 7) is seated. This ring assembly 171 is typically supplied by Greene & Tweed of New Wales, Pa. It includes a ring 173 of generally T-section of elastomeric material such as rubber. For use at room temperatures Buna-N latex is suitable. At high temperatures, for example 500° F., a high-temperature-resistant material, for example, VITON latex is used. The ring 173 is encased between back-up rings 175 typically of NYLON composition. These back-up rings suppress the extrusion of the elastomeric ring 173. The inner portion 145 also has an annular slot in its nose. In this slot there is an elastomeric ring assembly 176 including an elastomeric ring 177 of L-section encircled by a back-up ring 179 of NYLON composition.

Extending from the opening 161 there is a central opening 181 of circular section which communicates with an opening 183 of circular section and of larger diameter than 181. A seat 185 for a ball valve 187 which operates as a valve extends outwardly from the common boundary of the openings 181 and 183. The ball 187 is urged against the seat 185 by a spring 189 compressed by a spring retainer 191 having a central opening 193 in communication with the holes 100 and 101 in the fluid activator 91 – 93. The annular region 195 at the nose of the portion 145 is peened over to secure the spring retainer 191. After peening the annulus 195 is outwardly of the boundaries of the groove in which the seal assembly 176 is seated as shown in FIG. 7.

The check valve 95 is dimensioned to seat in the port 99 of the fluid activator and to effectively seal the joints between the check valve 95 and the port 99 against leaks when fluid under high pressure is injected through the check valves through the openings 100 and 101. The joints between check valve 95 and port 99 are also sealed to hold effectively the pressure built up when the Parker hollow-hex-head plug is screwed into opening 161.

The bleed screw 97 (FIGS. 8 and 9) has a head 201 and a threaded body 203 extending from the head 201. The thread of body 203 is cut to mesh with the thread 127 in bleed port 103. The head 201 has a central hexagonal opening 205 for accommodating a wrench so that the screw 97 may be screwed into the bleed port 103. The head 201 also has an annular slot within which a seal assembly 207 is inserted. This assembly 207 includes an elastomeric ring 209 of transverse T-section secured against extrusion by back-up rings 211 of NYLON composition. The bleed screw 97 is dimensioned to seat in port 103 when it is screwed in and to seal the joints between the screw 97 and the port 103 against leakage when high pressure is applied.

The check valve 95, including the Parker plug, and bleed screw 97 are constructed to secure the apparatus against leakage of fluid when only a portion of the fluid is drained. Where the fluid is drained completely or to a substantial extent, the check valve and bleed screw may be of less complicated structure or even eliminated. For example, the fluid may be injected through only one opening, such as the bleed port 103, without any valves in the port. The pressure would then be maintained by the pumps which supply the fluid. Once these pumps are disconnected, after the spacer 77 is inserted, the fluid pressure would be automatically relaxed.

Figure 2A:
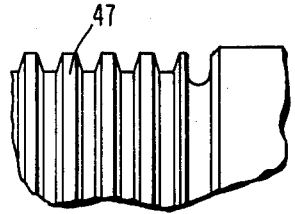
FIG. 2A is an enlarged fragmental view in side elevation predominately of the portion of the mandrel included in area IIA of FIG. 2.

The nut 75 is threaded internally to screw on thread 47 (FIGS. 2, 2A) at the end of mandrel 23. This nut is provided along its periphery with a plurality of screw plugs (not shown) with inserts (not shown) of NYLON composition so that it may be screwed onto the mandrel 23. The nut 75 is dimensioned to restrict or prevent the movement of the split-cylinder pressure applying assembly 27 along the mandrel 23 outwardly of the roll assembly 25.

The split spacer 77 (FIGS. 12, 13) is formed of two semi-circular half-rings 221 and 223. At one end the half rings are joined by a link 225, similar to the link of a bicycle chain. One eye 227 of this link 225 is secured to a pin 229 extending from half ring 221. The other eye 231 is rotatable on a pin 233 extending from half ring 223. Half-ring 223 can thus pivot about pin 233 to open the spacer 77. At the opposite end, 180°, from the first end, half-ring 223 is provided with a link 235 whose one eye 237 is secured to a pin 239 extending from half ring 223. The half-ring 221 is provided with a pin 241 into which the other eye 243, that has a slot 245, latches to secure the spacer 77 once it encircles a body. In lieu of the linkage structure just described, particularly in cases where the mandrel 23 is vertical, the spacer could be formed of two abutting half rings or a plurality of segments of a ring. The pressure would hold the segments together.

Typical significant dimensions in inches of a split spacer 77 used in the practice of this invention are as follows:

Outside diameter — 12.250
Inside diameter — 10.760
Thickness — 0.270
Taper along outer surface 251 of spacer 77 — 0.002 per 0.750 length
Bevel 253 — 55° ± $^{2°}_{0°}$
Start of bevel 253 — 0.18 from outer surface 255

Typically, the shoe 71, the fluid activator 73, the nut 75 and the split spacer 77 are each composed of AISI 3345 alloy tool steel quenched and tempered to 350 Brinell hardness. This steel is strong and tough and has a 0.2% yield stress of about 140,000 pounds per square inch.

The split-piston pressure applying assembly 27 is initially assembled on the mandrel 23 with the shoe 71 abutting the spacer 59. The fluid activator 91 – 93 is disposed adjacent the shoe with its foot 93 engaging the outer surface of the body 81 of the shoe and its stem 91 extending along the radial surface of the body 81. The nut 75 is screwed onto the mandrel abutting the activator 73.

With the pressure applying assembly 27 so assembled, there is an annular slot-like chamber 261 between the body 81 of the shoe 71 and the stem 91 and a gap 263 between the end of the foot 93 of the annulus 91 – 93 and flange 83. This chamber 261 communicates with opening 101 and through it and opening 100 with the check valve 95. Chamber 261 also communicates with opening 105 and through it with bleed port 103. Typically, the chamber 261 has a width of 0.0556 inch and the gap 263 has a width of 0.2456 inch. At this stage the split spacer 77 is not, and cannot be, inserted in the gap. The bleed port 103 is sealed by screw 97. Chamber 261 is sealed by seal ring units 43, 45, and 79. Each unit includes an elastomeric ring 265 of transverse T-section and back-up rings 267 of NYLON composition to suppress extrusion of the elastomer.

To apply lateral pressure to the roll 251, fluid is injected through the check valve 95 into chamber 261. High pressure is built up in the chamber and high tension is applied to the mandrel 23 elongating the mandrel. The shoe 71 and fluid activator 73 are separated, operating as split cylinders and the width of the gap 263 is enlarged typically to about 0.272 inch. The split spacer 77 (0.270 inch) is then opened about link 225, inserted in the gap 263 and latched closed at link 235. The bleed screw 97 is then removed bleeding the fluid partially or wholly out of the chamber 261. The mandrel 23 acting as strong spring then applies lateral pressure to the roll 51 through the spacer 77 which is under high pressure.

Typically, the outer diameter of the chamber 261 is 10.501 inches and the inner diameter is 8.251 inches. The area of the chamber (261) walls of the split pistons (71, 73) is 33.14 square inches. At 10,000 psi impressed through the check valve 95 the thrust is 331,400 pounds; at 11,000 psi, 364,540 pounds; at 12,000 psi, 397,680 pounds or about 400,000 pounds.

The diameter of the mandrel 23 where the pressure is applied is 8.249 inches. The area is 53.5 square inches. The stress on the mandrel impressed by 400,000 pounds of thrust is about 7,500 psi well within the 0.2% yield stress. The mandrel 23 is then stressed within its elastic limit and is capable of applying a high restoring force.

While preferred embodiments of this invention hve been disclosed herein, many modifications thereof are feasible. This invention is not to be resticted except insofar as is necessitated by the spirit of the prior art.

I claim:

1. Roll apparatus for reducing work including an arbor, roll means mounted on said arbor for rotation therewith, a member mounted on said arbor adjacent said roll means, said member cooperatively forming with said roll means a chamber and a gap, said gap being located laterally of said roll means and being accessible from the outside of said member and roll means, means for sealing said chamber, means, connected to said arbor and member, for preventing movement of said member along said arbor relative to said arbor, means, connected to said chamber, selectively operable, for injecting fluid into said chamber, to exert pressure in said chamber to elongate said arbor and to enlarge the width of said gap, and for draining said fluid from said chamber to contract said arbor and reduce the pressure in said chamber to reduce the width of said gap, and a spacer having a width greater than said reduced width of said gap and smaller than said enlarged width of said gap to be interposed in said gap after its width is enlarged and to be compressed after the width of said gap is reduced, said spacer when so interposed impressing lateral pressure on said roll means to prevent rotation of said roll means relative to said arbor.

2. The apparatus according to claim 1 wherein the roll means includes a roll and a shoe both mounted on said arbor, said shoe being mounted, when actuated, to apply lateral pressure to said roll, the member being mounted on said arbor adjacent said shoe, said member, shoe and arbor forming the chamber between their surfaces and said member and shoe forming the gap between their surfaces, means, connected to said shoe and member and to said arbor and shoe for sealing said chamber, the fluid supplied to said chamber impressing pressure between said member and shoe to enlarge the width of said gap and the draining of the fluid at least partially reducing the width of said gap, the compression of the spacer in said gap exerting pressure on said shoe actuating said shoe to apply lateral pressure to said roll to suppress the rotation of said roll relative to said arbor.

3. The apparatus of claim 1 wherein the chamber is an annular chamber extending radially from the arbor to a boundary radially inwardly of the outer surface of the member, and the gap is an annular gap defined by lateral surfaces of the member and roll means along their peripheral surfaces.

4. The apparatus of claim 1 wherein the chamber is sealed by a first sealing ring between the mandrel and the member, a second sealing ring between the mandrel and the roll means and a third sealing ring between the member and the roll means.

5. The apparatus of claim 1 including an abutment meams engaged with the mandrel on the side of the member remote from the roll, the said abutment means being contiguous to the member, the supply of fluid to the chamber causing the abutment means to be urged away from the roll and the shoe to be urged towards the roll.

6. The roll apparatus of claim 1 wherein the width of the spacer is symmetrical about the axis of the roll so that the reactive force exerted by the spacer on the roll has sustantially no component perpendicular to the arbor.

7. The method of impressing lateral pressure on roll means mounted on an arbor to suppress rotation of said roll means relative to said arbor, the said method being practiced with apparatus including a member, mounted on said arbor adjacent said roll means and prevented from moving along said arbor relative to said arbor, said member cooperatively forming with said roll means a sealed chamber and a gap, said gap being located laterally of said roll means, said gap being accessible from outside of said member and roll means, and also with a spacer having a width greater than the width of said gap, the said method comprising injecting fluid into said sealed chamber to elongate said arbor and enlarge the width of said gap to a width greater than the width of said spacer, interposing said spacer in said gap, draining fluid from said chamber to retract said arbor so that the width of said gap is reduced to a magnitude smaller than the width of said spacer, thereby, through said spacer, to apply lateral pressure to the roll means to prevent rotation thereof relative to said arbor.

8. The method of claim 7 wherein the tension applied to the arbor is within the elastic limit of the arbor.

9. Roll apparatus for reducing work including an arbor, an annular roll mounted on said arbor for rotation therewith, an annular shoe mounted on said arbor and connected to said roll to transmit pressure thereto, an annular member mounted on said arbor on the side of said shoe remote from said roll, said member being in engagement with said shoe and cooperatively forming with said shoe an annular chamber bounded by the surfaces of said mandrel, shoe and member and at an annular gap bounded by the surfaces of said member and shoe, said gap being located, laterally of said roll, between said chamber and said roll and being open along the outer periphery of said member and shoe, means, connected to said member, shoe and mandrel for sealing said chamber, means, connected to said arbor and said member, for preventing the movement of said member along said arbor relative to said arbor, means, connected to said chamber, for selectively supplying a fluid to said chamber to exert pressure between said member and shoe to elongate said arbor and to enlarge the width of said gap and for draining said fluid to relieve said pressure and reduce the width of said gap, and an annular spacer having a width greater than the reduced width of said gap but smaller than the enlarged width of said gap, to be interposed in said gap when the width of said gap is enlarged and to be compressed between said member and shoe when said pressure is relieved, said spacer when so interposed impressing lateral pressure on said roll to prevent rotation of said roll relative to said arbor.

10. The apparatus of claim 9 wherein the member is of L cross section having a stem and a foot and the shoe has a body and a flange, the chamber being formed between the radially extending inner surface of the body of said shoe and the radially extending inner surface of the stem of said member and the gap being formed between the radially extending outer surface of the foot of said member and the radially extending outer surface of the flange of said shoe.

11. The apparatus of claim 10 wherein the circumferentially extending surfaces of the body of the shoe and of the flange of member abut and sealing means is interposed in the joint between said surfaces.

12. Apparatus for applying pressure to a body including a resilient support on which said body is to be mounted, a first member mounted on said support adjacent said body, a second member mounted on said support adjacent said first member, said first and second members cooperatively forming between them a chamber and a gap, said gap being located laterally of the position to be occupied by said body and said gap being accessible from the outside of said support, means for sealing said chamber, means on the side opposite to said first member for preventing the movement of said second member along said support relative to said support, means selectively operable for injecting a fluid into said chamber for producing pressure in said chamber to elongate said support and to enlarge the width of said gap, and for draining said fluid to reduce the pressure in said chamber to retract said support and reduce the width of said gap, and a spacer, having a width smaller than the enlarged width of said gap but greater than the reduced width of said gap, interposed in said gap after said width of said gap is enlarged exerting said pressure on said body through said first member after said width of said gap is reduced.

13. The apparatus of claim 12 wherein the support is of circularly cylindrical cross section, the first and second members are annular and are mounted coaxially on the support movable axially along the support, the chamber is annular coaxially about the support, the gap is annular coaxially about the support and the spacer is annular and the pressure is applied axially of the support.

14. The apparatus of claim 12 wherein the chamber is sealed by first sealing means between the support and first member, second sealing means between the support and second member and third sealing means between the first and second members.

15. The apparatus of claim 13 wherein the chamber is sealed by a first annular seal between the support and first member, a second annular seal between the support and second member and a third annular seal between the first member and the second member.

16. The method of applying pressure to a body with apparatus including a support, a first member on said support adapted to contact said body and to be located so as to apply pressure to said body when said member is under pressure, a second member on said support adjacent the side of said first member to be remote from said body, a gap being formed between said first and second members, said gap being accessible from outside said first and second, a sealed chamber also being formed between said first and second members, and means on the side of said second member remote from said first member for restricting the movement of said second member along said support, the said method comprising, by injecting fluid into said sealed chamber applying tensile stress to said support to elongate said support, separating said first and second members and enlarging the width of said gap, with said gap enlarged inserting a spacer in said gap, and after said spacer is inserted in said gap at least partially relaxing the tension on said member by withdrawing at least a portion of said fluid to reduce the width of said gap, said spacer having a width smaller than the enlarged width of said gap and greater than the reduced width of said gap, whereby when the width of said gap is reduced as aforesaid, pressure is applied to said body through said first member.

17. The method of claim 16 wherein the support is composed of a material which has a high elastic limit and is tensioned by stress within the elastic limit.

18. Apparatus for applying pressure to a body symmetrical about an axis said apparatus including a resilient support, said body to be mounted on said support so that said support is coaxial with said body and symmetrical about said axis, a first member mounted on said support adapted to be contiguous to said body, a second member mounted on said support adjacent to said first member on the side of said first member remote from said body, said first and second members forming a sealed chamber and also forming between them a gap to be located laterally of said body, said gap being accessible from outside of said first and second members, means on the side of said second member remote from said first member restricting the movement of said second member along said support, means for sealing said chamber, means, connected to said chamber, for injecting fluid into said chamber to build up pressure therein, separating said first and second members to cause said support to expand resiliently and the width of said gap to enlarge and also for draining said fluid at least partially from said chamber to reduce the width of said gap, and a spacer, having a width greater than the reduced width of said gap and smaller than the width of said gap when enlarged, to be interposed in said gap when enlarged for applying said pressure on the draining of said fluid, the width of said spacer being symmetrical about said axis whereby the reactive force exerted by said spacer on said body has substantially no component perpendicular to said support.

* * * * *